(12) United States Patent
Wagner et al.

(10) Patent No.: US 6,360,779 B1
(45) Date of Patent: Mar. 26, 2002

(54) CLOSURE DEVICE FOR A PIPE/WALL APERTURE

(75) Inventors: Robert Joseph Wagner, Bristol; Mary Geragi, Fairless Hills; Timothy Wayne South, Morrisville, all of PA (US)

(73) Assignee: Aqueduct Utility Pipe Contractor, Inc., Levittown, PA (US)

( * ) Notice: Subject to any disclaimer, the term of this patent is extended or adjusted under 35 U.S.C. 154(b) by 0 days.

(21) Appl. No.: 09/832,620

(22) Filed: Apr. 11, 2001

(51) Int. Cl.[7] .............................................. F16L 55/105
(52) U.S. Cl. .............................. 138/92; 138/89; 52/514; 220/802; 220/DIG. 19
(58) Field of Search ....................... 138/92, 89; 52/514; 220/802, DIG. 19

(56) References Cited

U.S. PATENT DOCUMENTS

| | | |
|---|---|---|
| 73,439 A | 1/1868 | Copeland |
| 733,014 A | 7/1903 | Cox |
| 821,041 A | 5/1906 | Kinney |
| 849,415 A | 4/1907 | McGowan |
| 932,766 A | 8/1909 | Daniels |
| 1,287,042 A | 12/1918 | Kennedy |
| 1,800,173 A | 4/1931 | Anderson |
| 2,139,491 A | 12/1938 | Dawson ........................ 126/319 |
| 2,362,675 A | 11/1944 | Stebbins ........................ 138/89 |
| 2,420,353 A | 5/1947 | Burrows ........................ 220/24 |
| 3,289,875 A | 12/1966 | Delamater ................. 220/24.5 |
| 3,471,179 A | 10/1969 | Sixt ............................. 285/176 |
| 3,578,027 A | 5/1971 | Zopfi ........................... 138/89 |
| 3,675,685 A * | 7/1972 | Potter ........................... 138/89 |
| 3,807,457 A | 4/1974 | Logsdon ....................... 138/89 |
| 4,261,243 A * | 4/1981 | Palmer ....................... 411/510 |
| 4,262,701 A | 4/1981 | Beacom ....................... 138/89 |
| 4,402,641 A * | 9/1983 | Arff ............................ 411/510 |
| 4,432,465 A * | 2/1984 | Wuertz ........................ 138/89 |
| 4,462,430 A | 7/1984 | Anthony et al. ............. 138/89 |
| 4,598,738 A * | 7/1986 | Weber et al. ................ 138/89 |
| 4,998,642 A * | 3/1991 | Kraus .................. 220/DIG. 19 |
| 5,496,141 A * | 3/1996 | Popsys ....................... 411/510 |
| 5,829,482 A * | 11/1998 | Zakabatake .................. 138/89 |
| 6,032,694 A * | 3/2000 | Wellen et al. ................ 138/89 |
| 6,058,977 A * | 5/2000 | Hotta ........................... 138/89 |
| 6,189,573 B1 * | 2/2001 | Ziehm ......................... 138/89 |
| 6,250,337 B1 * | 6/2001 | Bevacco ...................... 138/89 |

FOREIGN PATENT DOCUMENTS

FR 2334869 7/1977

* cited by examiner

Primary Examiner—James Hook
(74) Attorney, Agent, or Firm—Kenneth Watov; Watov & Kipnes, P.C.

(57) ABSTRACT

A stopper device for blocking an aperture in a pipe member wall, a sheetrock wall and so forth, the stopper device comprising a substantially planar cap member with top and bottom sides, the top side further including a plurality of strengthening ribs with even-tapered ends extending along the surface thereof, a stem projecting from the bottom side of the cap member, the stem further including at least a pair of radially-spaced vanes extending along and projecting from its longitudinal axis, and a plurality of spaced apart axially-spaced circumferential webs each projecting radially from the longitudinal axis of the stem, and each being parallel to one another.

15 Claims, 7 Drawing Sheets

CLOSURE DEVICE FOR A PIPE/WALL APERTURE

RELATED APPLICATION

This Application is related to, and has a common Assignee with, co-pending Design application Ser. No. 29/140,013 filed on Apr. 11, 2001 herein for "PLUG FOR APERTURES."

FIELD OF THE INVENTION

The present invention relates generally to stopper devices for blocking apertures, more particularly to stopper or plug devices for blocking lift holes which are typically provided in sidewall portions of tubular conduits, such as utility pipes, and for blocking holes in walls of sheetrock, for example.

BACKGROUND OF THE INVENTION

Pipes and tubular conduits are commonly used to provide enclosed facilitated passageways for fluids, wires, cables, utility equipment, and other objects which are dispatched therethrough between opposing ends. Such pipes may be composed of metal, concrete, plastic polymer, poured cement, and the like, and are typically assembled in sections. During installation, an opening is typically provided in the side portion of a pipe section usually extending laterally and substantially aligned with the center of gravity of the corresponding section. This opening is usually referred to as a lift aperture or hole, and greatly facilitates the lifting and moving of the pipe section from one place to another. The lift aperture is configured to be operated in association with a lift apparatus. A lift member attached to the end of a cable, sling or arm, for example, of the lift apparatus, is configured to couple with the lift aperture for secure connection therebetween. In this manner, the pipe section can conveniently be lifted and loaded onto suitable transportation vehicles, unloaded at the installation site, and adeptly positioned in a trench along with a series of other pipe sections which are placed end to end to form a continuous conduit. Afterward, the newly formed conduit is ready for conveying drain water, and the like, or dispatching utility and telephone cables and equipment therethrough.

Before interring the assembled pipe beneath the ground, the lift apertures or holes must be blocked or plugged to prevent any external moisture, dust, dirt, debris and the like, from entering the pipe's interior. Such lift aperture, if left unblocked, or partially or ineffectively blocked, can ultimately allow dirt to enter the pipe and contaminate the contents, or can trigger sinkholes and/or initiate other complications which would require costly re-excavation and repair. To prevent such problems, local ordinances and laws typically require workers on site to search in the immediate work area for suitable rocks or other debris of appropriate size and shape, to insert the rock into the lift aperture while ensuring secure fit and retainment. The rock and blocked aperture are covered with an amount of mortar or poured concrete necessary to seal and secure the rock in place. Once the mortar is set, the pipe positioned in the trench, is buried with soil or suitable fill.

Such ad hoc techniques of using rocks and debris to block lift apertures, are cumbersome, time-consuming, and very inefficient. Oftentimes, it is particularly difficult to find rocks or other debris of sufficient size and/or girth for insertion into the apertures with a snug fit, and searching for such rocks is often frustrating and time-consuming. Searching in this trial and error manner, takes away significant time and labor from the actual installation work. In addition, the rock plugs can be easily dislodged by construction equipment (i.e., backhoe), rain and moisture, fill soil, and other environmental forces. If insufficient mortar is used, the rock plug can become dislodged, resulting in the problems discussed above. One attempt at minimizing the inefficiency, includes using disposable paper cups filled with poured concrete as aperture stoppers. Although the time spent for searching is reduced, the inefficiencies associated with rock plugs including limited size variability, poor fit and retention, ease of dislodgement, and the need to apply an amount of mortar, remain.

For the foregoing reasons, there is a need for an aperture stopper that overcomes the problems encountered in the prior art. It would therefore be a significant advance in the art to develop an aperture stopper for pipe and conduits which provides excellent retention for a range of aperture sizes, is easy and inexpensive to fabricate, foregoes the need for applying poured concrete or mortar over the aperture, is durable and strong over a range of temperatures and environmental conditions, and, above all, is simple to use.

SUMMARY OF THE INVENTION

The present invention is generally directed to a stopper device for blocking an aperture in a wall of sheetrock, a pipe member wall, and the like, comprised of a cap member with a stem projecting from the cap member. The stem further includes radially directed web means for anchoring the cap member to the pipe aperture in a manner which provides the benefits of efficient and effective blocking of the pipe aperture for maintaining a firm barrier between the exterior and interior portions of the pipe.

In particular, one aspect of the present invention is directed to a stopper device for blocking an aperture in a pipe member, a sheetrock wall, and so forth in which the stopper device comprises:

a substantially planar cap member with a top side and a bottom side;

a stem projecting from the bottom side of the cap member; and a plurality of axially-spaced circumferential webs each radially projecting from the longitudinal axis of the stem.

BRIEF DESCRIPTION OF THE DRAWINGS

Various embodiments of the invention are described in detail below with reference to the drawings, in which like items are identified by the same reference designation, wherein.

DETAILED DESCRIPTION OF THE INVENTION

Figure 1:
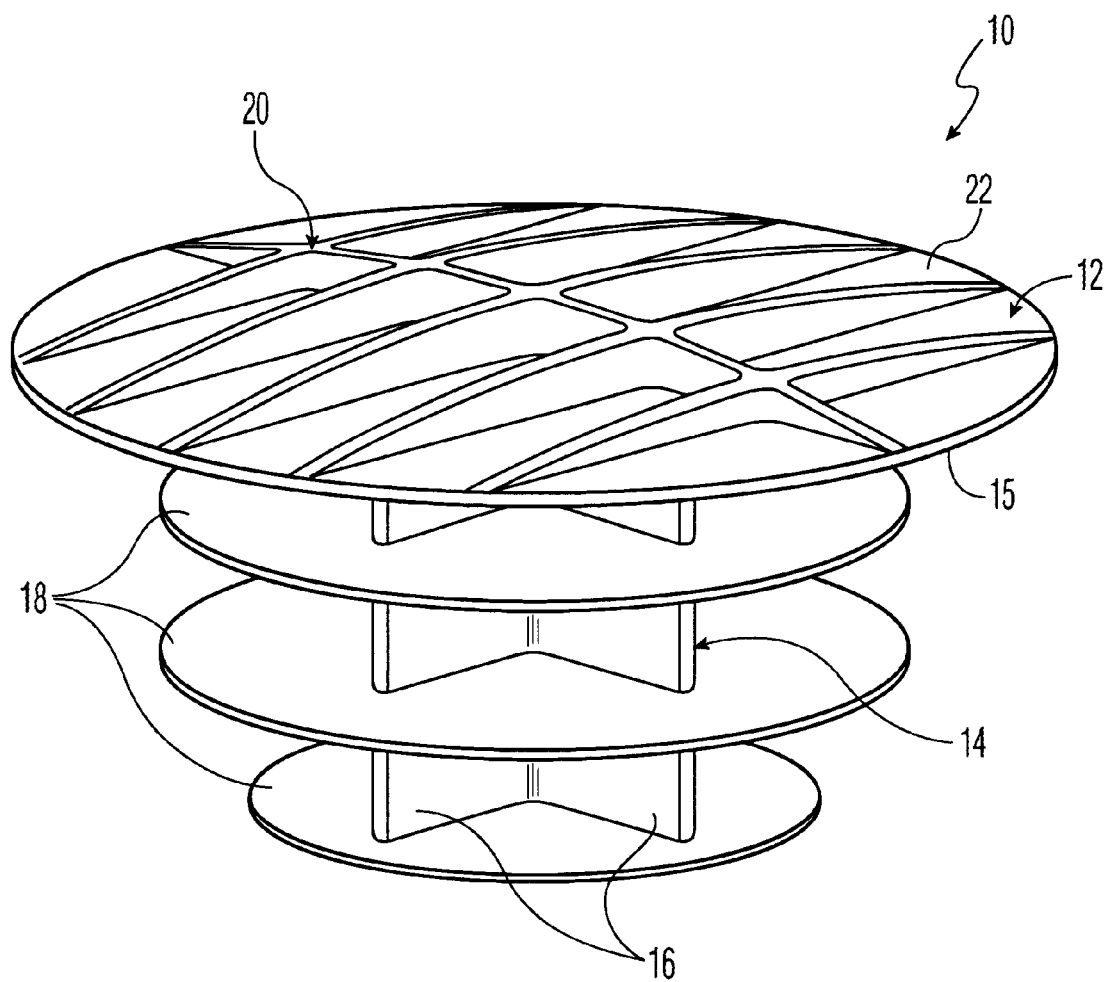
FIG. 1 is a perspective view of one embodiment of a stopper device according to the present invention.

The present invention is generally directed to a stopper device constructed in a manner that provides a secure closure for an aperture of a pipe, to prevent dirt, moisture, and the like, from entering the interior of the pipe through the aperture. The stopper device can be also used to block holes in level wall surfaces including those consisting of sheetrock, for example. The stopper device is constructed with the advantage of anchoring means to prevent accidental pullout or displacement over a period of time from the blocked aperture, while maintaining the simplicity in design and fabrication, as well as cost effectiveness required for use in construction projects and the like. In addition, the stopper device is constructed in a manner which provides ease of use, long term durability, and effective blocking capability. The cost effective and efficient manner by which these stopper devices are constructed, and their simplicity of use, as opposed to inefficiently searching the grounds for suitable rocks and debris in a trial and error manner, makes the stopper devices of the present invention especially suitable for construction and building use.

Conventional pipes made of poured cement, concrete, plastic, metal and the like are typically comprised of pipe sections of a particular length for permitting ease of transport and construction. Such pipes are typically provided at one end with a stepped reduced outer diameter portion for fitting within the enlarged inner diameter portion disposed at the other end, thus providing a mutual interlocking of a series of pipe sections. The pipe may be circularly or elliptically cylindrical, but can be made with other cross sectional shapes and sizes as desired.

Each pipe section is provided with one or more lift apertures which are appropriately set laterally in the walls of the pipe section for permitting a lifting mechanism such as a crane, for example, to effectively lift the pipe section along its center of gravity. The lift aperture allows a lift member connected to a lift apparatus for coupling with the lift aperture. In this manner, the lifting apparatus can maneuver the corresponding pipe section for safe lifting and transporting. When the pipe section is placed at a final installation site, and the lifting member is disengaged from the lift aperture, the pipe section is left oriented with the lift aperture opened upwardly. Unfortunately, this leaves the aperture open to dirt, liquid, and the like, permitting undesirable entry thereof into the pipe section, which over time can result in major cost and repair, due to necessary excavation of the burred pipe section.

Before describing the details of the present invention, the stopper device of the present invention, in addition to effectively and securely blocking the lift aperture in the wall of the pipe section, eliminates the need to use conventional means including searching for a rock, brick, a piece of concrete, debris and the like which can often be time-consuming and inefficient. Also, such searching can effectively hold up the completion of the construction project and generate cost overruns and the like.

Referring to FIG. 1, a stopper device 10 of the present invention includes a substantially planar cap member 12, and a stem 14 extending from a bottom side 15 of the cap member 12. The stem 14 further comprises a plurality of vanes 16 radially-spaced apart and extending outwardly and along its longitudinal axis. The stopper device 10 further includes a plurality of circumferential webs 18 radially projecting from the stem 14, and a plurality of strengthening ribs 20 disposed on a top side 22 of the cap member 12. The stopper device 10 can be of a unitary construction or a composition of individual parts fastened together with suitable means.

The stopper device 10 can be composed of any durable and rigid to semi-rigid material preferably including plastic materials such as polyamide, polyethylene, low density polychloropene, polyvinyl chloride, polyester, polypropylene, polystyrene, polytetrafluoroethene, and polyurethane, and the like, but more preferably polypropylene. The materials may also include elastomeric materials including silicone rubber, ethylene propylene diene monomer (E.P.D.M.), neoprene, santroprene rubber, polychloroprene, nitrile butadiene rubber, polyurethane, polybutadiene rubber, natural rubber, and the like. It is understood that the stopper device 10 of the present invention can be composed of any material which can effectively block the lift aperture of a pipe, and be securely retained therein over a range of environment forces and conditions Such a material must also be able to withstand the shear and compressive forces subjected to the aperture, and the surrounding areas during and after construction of the pipe.

Figure 2:
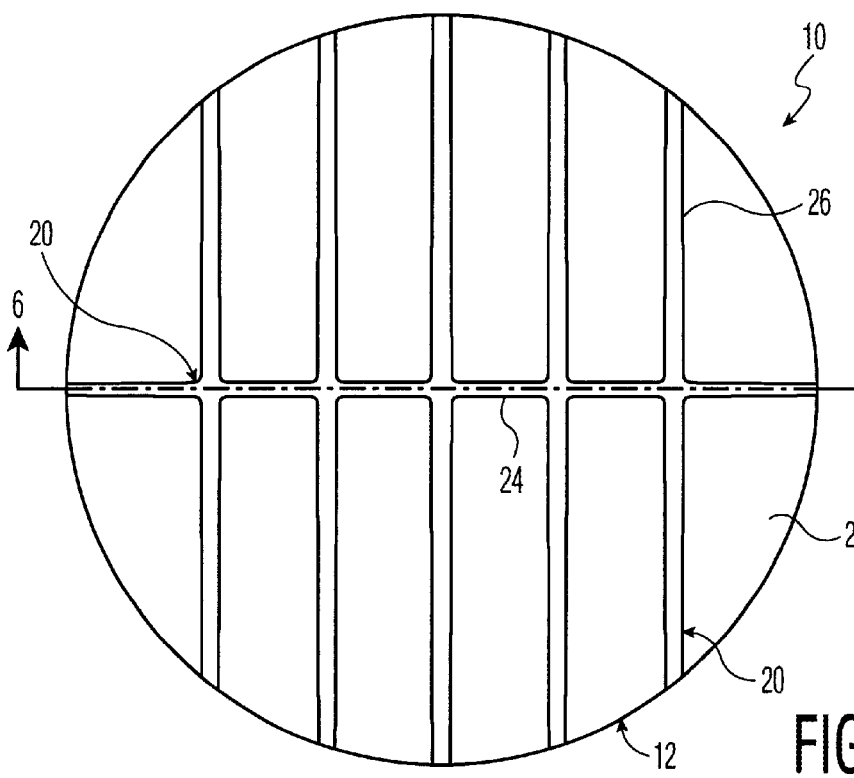
FIG. 2 is a top plan view of the stopper device of FIG. 1.

With reference to FIG. 2, the cap member 12 and the plurality of the circumferential webs 18 of the stopper device 10 are circular in shape to conform with a cylindrically-shaped aperture. The cap member 12 is preferably larger in diameter than the other portions of the stopper device 10, mainly to prevent the stopper device 10 from completely passing through the aperture of the pipe. It is noted that the stopper device 10 can be sized for blocking or plugging a plurality of different size holes. The plurality of the strengthening ribs 20 further comprises a central rib 24 and a plurality of transverse ribs 26 extending orthogonally from the central rib 24. The strengthening ribs 20 provide the cap member 12 significant structural integrity required to withstand the significant weight load of the soil covering the associated pipe, as well as the associated shear and compressive forces, while also providing the flexibility needed to conform to the wall of the pipe for good sealing engagement therebetween. The strengthening ribs 20 are also configured to taper from the middle of the central rib 24 to their respective ends. The central rib 24 tapers from its center to its opposing ends. This configuration along with the low profile of the cap member 12, minimizes or significantly reduces the frictional conditions on the top side 22 of the cap member 12. In this manner any object such as the backhoe of an earth-moving equipment or moving debris, would conveniently slide over the cap member 12, thus reducing the likelihood of accidental dislodgement and displacement of the stopper device 10 from the aperture and ensuring excellent retainment in the associated aperture.

Figure 3:
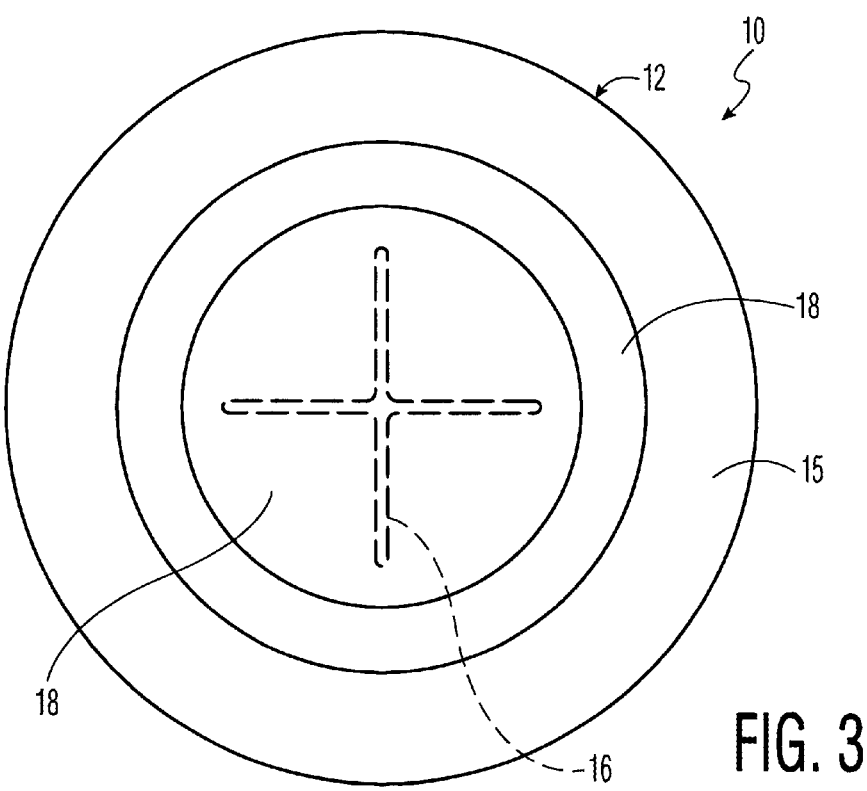
FIG. 3 is a bottom plan view of the stopper device of FIG. 1.

Referring now to FIG. 3, the bottom end of the stopper device includes one of the circumferential webs 18 to provide a smooth surface for minimizing any obstruction that may be generated if the end of the stopper device 10 protrudes slightly into the interior or cavity of the pipe. The length of the stopper device 10 is preferably limited to the span of the aperture or thickness of the wall portion to prevent protrusion into the associated pipe interior, thus avoiding any obstruction or interference with any fluid flow or the like in the pipe. Accordingly, the bottom end of the stopper device 10 is preferably made flush with the inside surface of the pipe wall. The vanes 16 provide good structural integrity with minimal material for minimizing lateral bending of the stem 14 and ensuring that the circumferential webs 18 remain substantially orthogonal to the axis of the aperture.

Figure 4A:
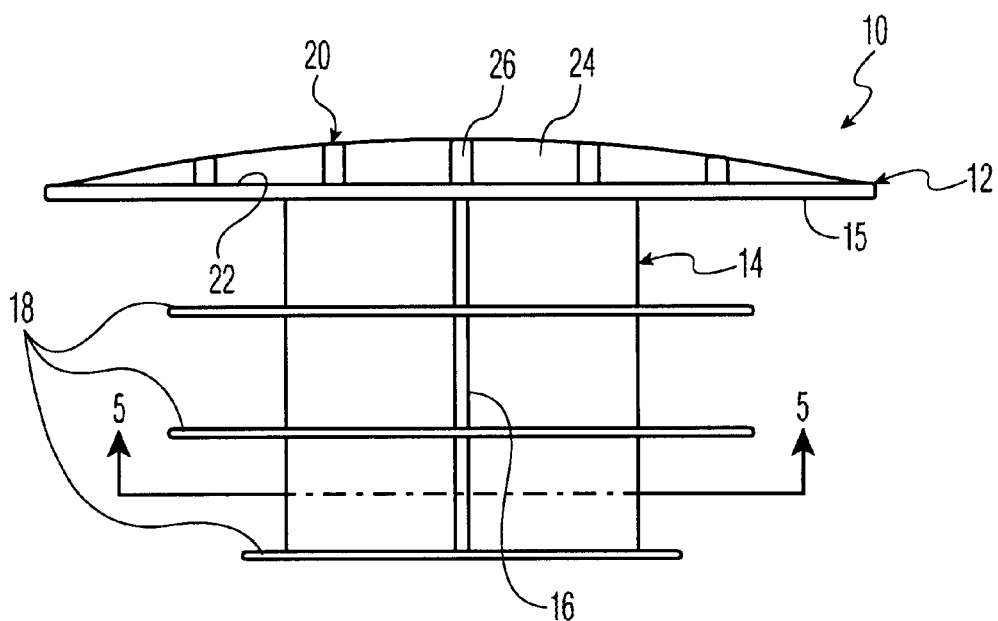
FIG. 4A is a front elevational view of the stopper device of FIG. 1, the back elevational view being identical thereto.
Figure 4B:
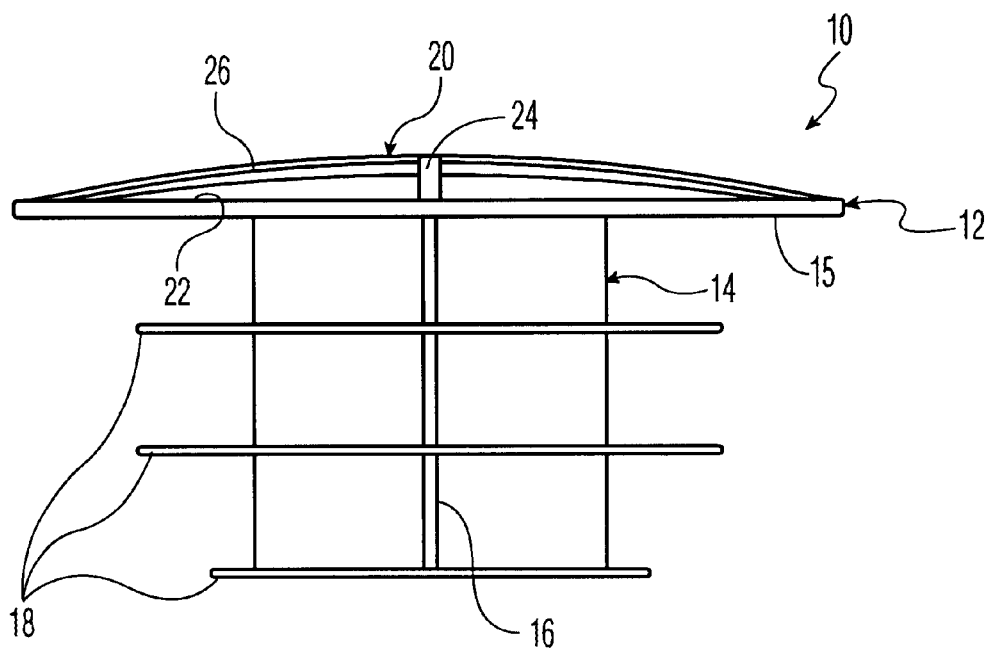
FIG. 4B is a right side elevational view of the stopper device of FIG. 1, the left side elevational view being identical thereto.

Referring to FIGS. 4A and 4B, the bottom portion 15 of the cap member 12 is substantially flat as shown, and is flexible enough to bend into and conform to the curved surface of the associated pipe upon insertion of the stopper device 10 into the lift aperture. The bottom side 15 of the cap member 12 can also be configured to conform and closely follow the curved peripheral contour of the pipe, thereby reducing or minimizing the presence of a space therebetween. The low profile of the cap member 12 and the strengthening ribs 20 are also best shown in FIGS. 4A and 4B for providing a reduced surface area, for minimizing engagement thereof with a moving object passing over the cap member 12.

As shown in FIGS. 4A and 4B, three circumferential webs 18 are provided in a spaced-apart parallel manner. The circumferential webs 18 are varied in diametric size to conform to varying diameters of the aperture, and to better conform to the irregular interior wall surfaces of the associated aperture. The use of multiple webs 18 also improves the sealing engagement and anchoring engagement of the stopper device 10 to the inside surface of the pipe aperture. It is understood that the number of webs 18 is not limited to three, and may include any number as required for secure retainment and blockage.

Figure 5:
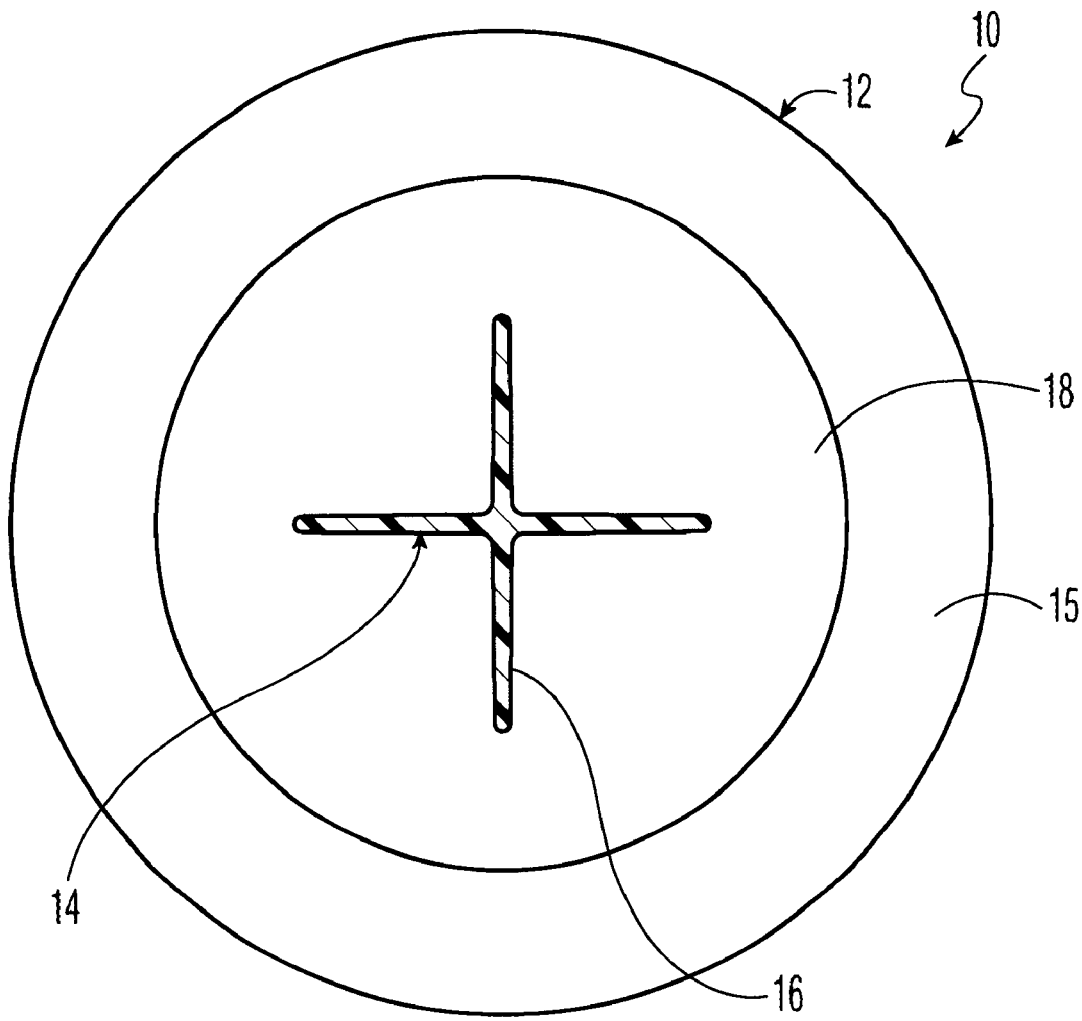
FIG. 5 is a cross sectional view of the stopper device taken along 5—5 in FIG. 4A.

Referring to FIG. 5, the stem 14 is positioned substantially at the center of the bottom side 15 of the cap member 12, with the stem 14 comprised of the plurality of the vanes 16. The vanes 16 provides exceptional structural rigidity with minimal material usage and weight. In addition, the vanes 16 provide significant structural support for the circumferential webs 18, thus improving the anchoring capability of the stopper device 10. The axis of the stem 14 extends substantially orthogonal to the bottom side 15 of the cap member 12, and ends with one of the circumferential webs 18 fixed thereon (as shown in FIG. 1). The example of the structure is shown in FIG. 5, wherein the vanes 18 are radially-spaced and substantially parallel to each other.

Figure 6A:
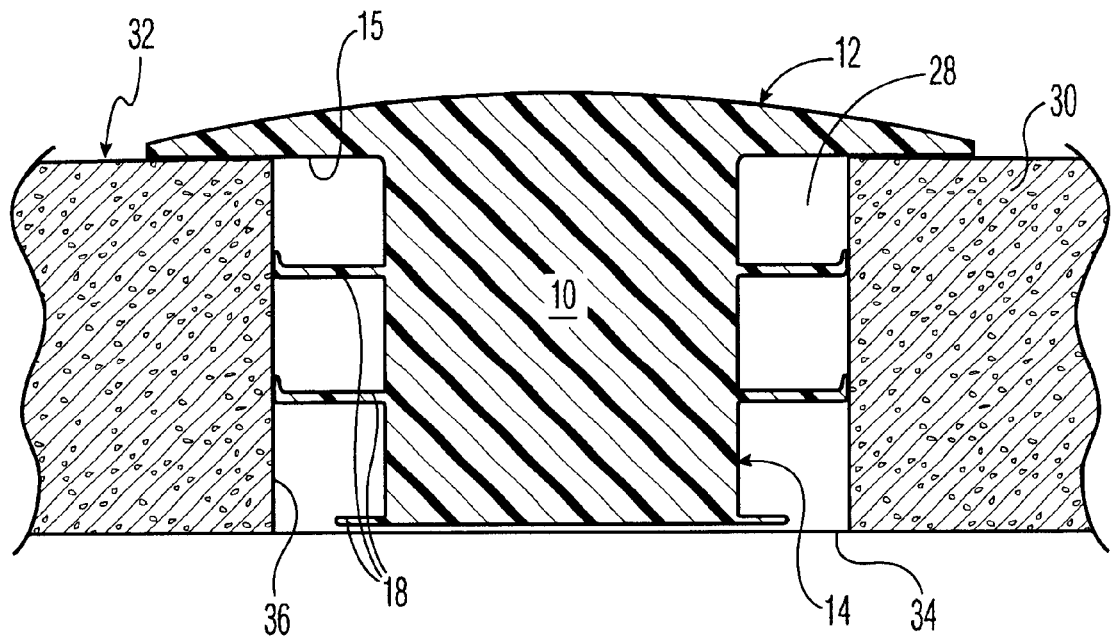
FIGS. 6A and 6B are each side cross sectional views of the stopper device inserted into a pipe apertures of differing diameters, respectively.
Figure 6B:
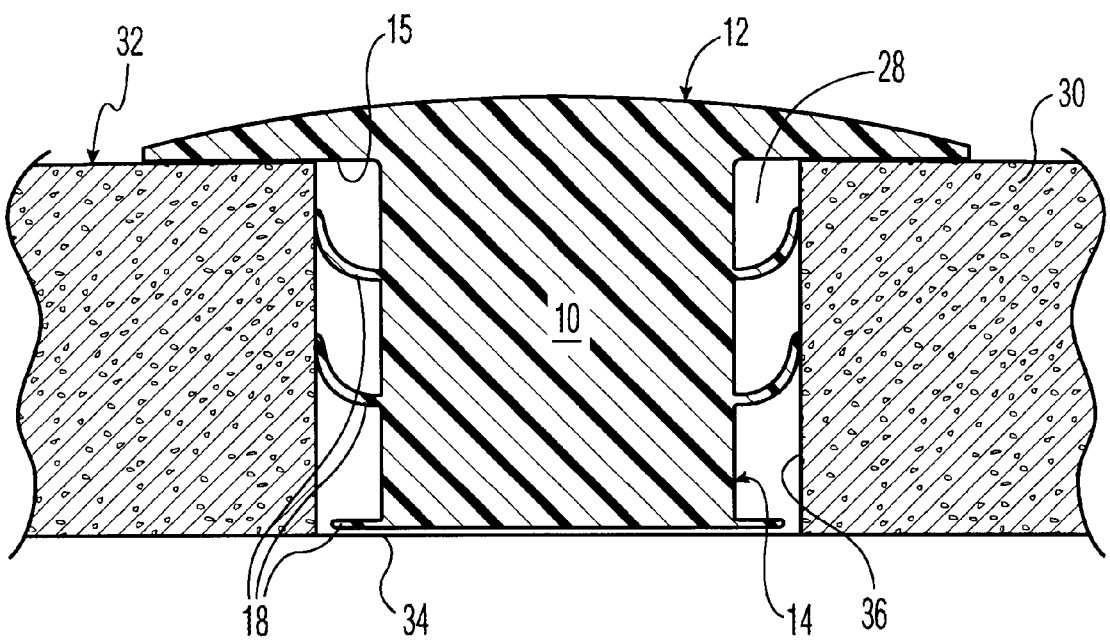

Referring to FIGS. 6A and 6B, the stopper device 10 is shown inserted into two apertures 28 of differing diameters, respectively, in a wall portion 30 of a pipe 32. The stopper device 10 is inserted with the stem 14 end first until the bottom 15 of the cap member 12 contacts the wall portion 30 of the pipe 32. When inserted into the aperture 28, it is preferable that the longitudinal length of the stopper device 10 is limited to the depth of the aperture 28 and not extend beyond a bottom opening 34 to prevent or minimize any interference or obstruction with the interior cavity of the pipe. The cap member 12 is preferably sized to extend over and beyond the aperture 28 and to create an overlap of the cap bottom 15 with the wall portion 30. Any amount of overlap of the cap member 12 is suitable for sufficient blocking or plugging of the aperture 28.

With the stopper device 10 inserted into the aperture 28, the circumferential webs 18 are configured to strongly bias against an inside wall surface portion 36 of the aperture 28 where it is frictionally and resiliently held to prevent fallout or displacement. Once the stopper device 10 is pushed into the aperture 28, the circumferential webs 18 are oriented in a manner to prevent pullout. The circumferential webs 18 also permit the stopper device 10 to be used for a range of aperture sizes and irregularities in the surface portion 36. In addition, the circumferential webs 18 are effective for use in apertures where the diameter varies along its span. Accordingly, an exact fit is not necessary provided one of the circumferential webs 18 possesses a sufficient reach to contact the inside wall surface portion 36 of the aperture 28. The stopper device 10 is configured to withstand any changes in the environment, and any changes in pressure between the interior exterior areas to the pipe 32. The design configuration eliminates or reduces the need to apply mortar for secure retainment.

The shape of the cap member 12 may also be any convenient shape, such as square, oval, rectangular and the like. The stopper device 10 may be modified to fit differently sized apertures or apertures of varying diameter. The size of the stopper device 10 can likewise vary to match the varying diametric sizes and lengths of a particular aperture. Note that the stopper device 10 of the present invention can easily be configured to plug any type of holes or apertures including such openings in pipe sections, wall sections and the like, where it is desired to seal the interior off from the environment during shipping, transportation and use, for example, or to seal the wall in a home, office or building.

Some examples of the standard pipe sizes and lift aperture diameters are provided as follows for reinforced concrete pipes with inside diameters of 12", 15"18" and 21", the lift holes are typically 2¾"±⅛". For reinforced concrete pipes with inside diameters of 24", 27"30" and 36", the lift holes are typically from about 2⅞"±⅛" to 3"±⅛". For reinforced concrete pipes with inside diameters of 42" and 48", the lift holes are typically from about 2⅞"±⅛" to 3"±⅛".

Figure 7:
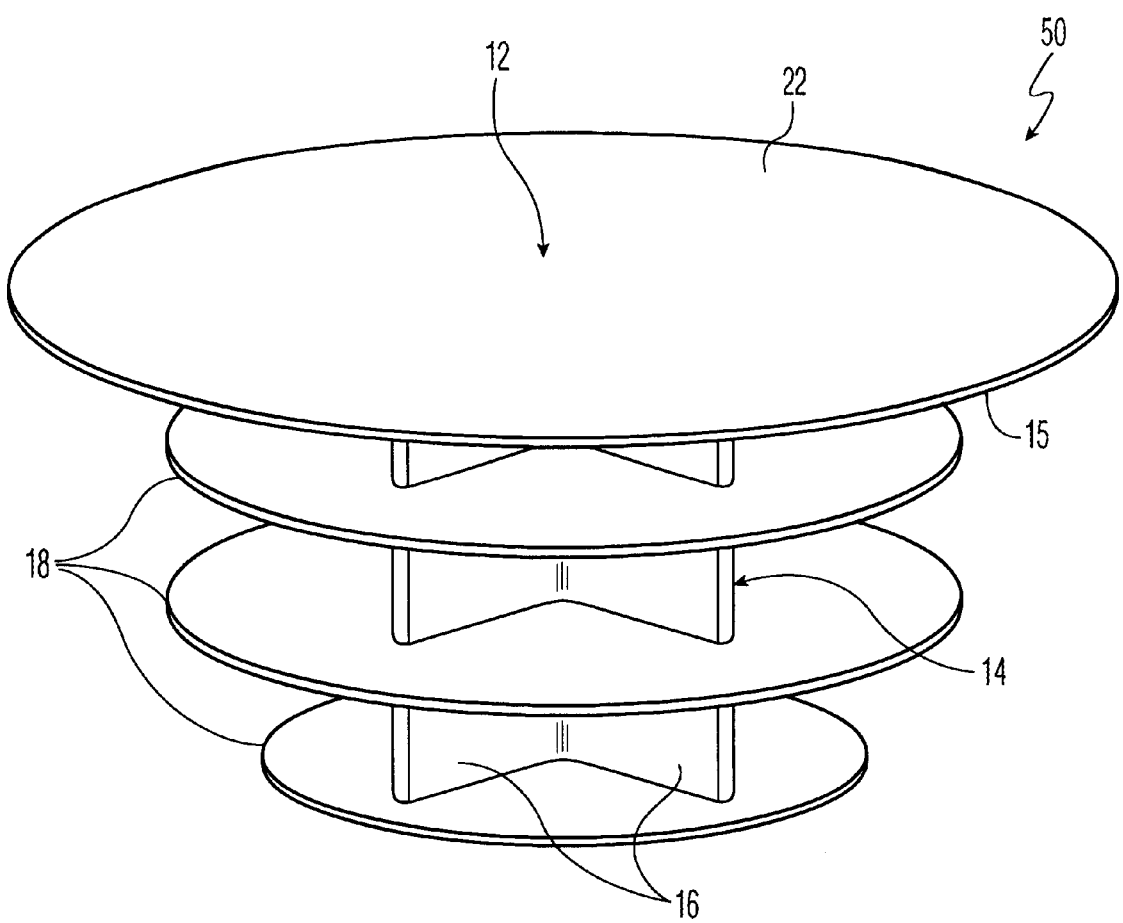
FIG. 7 is perspective view of a second embodiment of a stopper device of the present invention.

Referring to FIG. 7, an alternative embodiment of a stopper device 50 is shown. The stopper device 50 includes the same features of the stopper device 10 of the first embodiment. The cap member 12 of the stopper 50 includes a flat, thin profile for providing a flush fit with the surface of a level wall. The stopper device 50 can be used to block holes in the level walls during construction and/or repair. The walls can consist of sheetrock, plasterboard, concrete and the like. The flat profile of the cap member 12 allows the stopper device 50 to reside flush with the surface of the wall to provide an even surface over the area of the blocked hole whereby several coatings of plaster or mortar and paint can then be applied for providing a smooth even surface.

Figure 8:
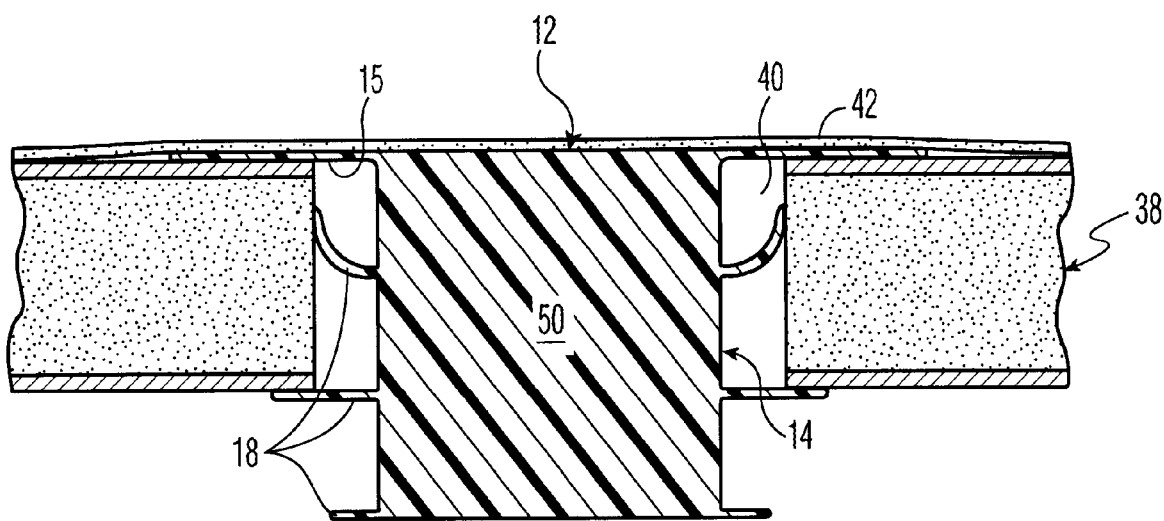
FIG. 8 is a cross sectional view of the stopper device of FIG. 7 inserted into a sheetrock wall aperture with a coating of plaster applied thereon.

With reference to FIG. 8, the stopper device 50 is inserted a hole 40 located in a sheetrock wall 38. The webs 18 provide snug retainment in the hole 40 with the bottom 15 of the cap member 12 contacting the outer surface of the wall 38. The low profile cap member 12 lies substantially flush with the surface of the wall 38 for permitting smooth surfacing under a layer of plaster 42. Alternatively, the stopper device 50 may be inserted in the hole 40 of the wall 38 without the layer of plaster 42 on top.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A stopper device for blocking an aperture in a pipe member wall, a sheetrock wall and so forth, said stopper device comprising:

a substantially planar cap member with a top side and a bottom side, the cap member being adapted to seat the bottom side thereof flush against a peripheral surface portion surrounding said aperture;

a stem projecting from the bottom side of the cap member;

a plurality of circumferential webs that each radially project from the longitudinal axis of said stem, and are axially spaced from one another; and a plurality of strengthening ribs extending along the surface of the top side of the cap member.

2. The stopper device of claim 1, wherein the plurality of the strengthening ribs further comprising tapered ends.

3. The stopper device of claim 1, wherein the stem further comprising at least a pair of radially-spaced apart vanes extending along and projecting from its longitudinal axis.

4. The stopper device of claim 1, wherein at least two of said plurality of circumferential webs have a different radius.

5. The stopper device of claim 1, wherein the cap member, the stem, and the plurality of circumferential webs are each composed of plastic.

6. The stopper device of claim 5, wherein the cap member, the stem, and the plurality of circumferential webs are comprised of a plastic selected from the group consisting of polyamide, polyethylene, polychloropene, polyvinyl chloride, polyester, polypropylene, polystyrene, polytetrafluoroethene, and polyurethane.

7. The stopper device of claim 1, wherein the cap member, the stem, and the plurality of circumferential webs are integrally molded.

8. The stopper device of claim 1, wherein the cap member and the plurality of circumferential webs are substantially parallel with one another.

9. The stopper device of claim 8, wherein the stem is substantially orthogonal to the cap member.

10. The stopper device of claim 1, wherein the cap member and the stem with the plurality of circumferential webs, are fabricated separately and attached together.

11. The stopper device of claim 1, wherein the cap member and the plurality of circumferential webs are substantially circular in shape.

12. The stopper device of claim 1, wherein the cap member, the stem, and the plurality of circumferential webs are comprised of an elastomeric material.

13. The stopper device of claim 12, wherein the elastomeric material is selected from the group consisting of silicone rubber, ethylene propylene diene monomer (E.P.D.M.), neoprene, santroprene rubber, polychloroprene, nitrile butadiene rubber, polyurethane, polybutadiene rubber, and natural rubber.

14. The stopper device of claim 1, wherein the number of the plurality of circumferential webs is three.

15. The stopper device of claim 1, wherein the plurality of the strengthening ribs include a central rib extending from one end to an opposing end of the cap member, and a plurality of transverse ribs each spaced-apart and extending orthogonally from the central rib along the top side of the cap member.

* * * * *